United States Patent [19]
Mizuta et al.

[11] Patent Number: 5,293,680
[45] Date of Patent: Mar. 15, 1994

[54] METHOD AND APPARATUS FOR PROCESSING MOLDED SYNTHETIC RESIN MATERIALS

[75] Inventors: Akira Mizuta; Masazumi Ogawa, both of Kanagawa, Japan

[73] Assignee: Fuji Photo Film Co., Ltd., Kanagawa, Japan

[21] Appl. No.: 82,523

[22] Filed: Jun. 25, 1993

Related U.S. Application Data

[63] Continuation of Ser. No. 868,863, Apr. 16, 1992, abandoned.

[30] Foreign Application Priority Data

Apr. 17, 1991 [JP] Japan ................... 3-85578

[51] Int. Cl.⁵ ............... B23Q 7/00; B65G 15/64; B28B 1/48
[52] U.S. Cl. ........................... 29/559; 29/806; 198/345.1; 264/156; 269/305
[58] Field of Search .............. 29/559, 799, 806; 83/451, 452; 198/345.1, 345.3; 264/156; 269/303, 304, 305, 269, 120

[56] References Cited

U.S. PATENT DOCUMENTS

| | | | |
|---|---|---|---|
| 2,249,230 | 7/1941 | Schafer | 198/345.1 |
| 3,876,196 | 4/1975 | Naggert | 269/304 |
| 4,660,280 | 4/1987 | Asai et al. | 198/345.1 |
| 4,928,806 | 5/1990 | Anderson et al. | 198/345.1 |

FOREIGN PATENT DOCUMENTS

| | | |
|---|---|---|
| 0073241 | 10/1982 | Japan . |
| 0114859 | 11/1985 | Japan . |
| 01-17125 | 5/1989 | Japan ............... 198/345.1 |
| 2-30499 | 1/1990 | Japan . |

*Primary Examiner*—Timothy V. Eley
*Attorney, Agent, or Firm*—Sughrue, Mion, Zinn, Macpeak & Seas

[57] ABSTRACT

Positions of a tail end of a molded synthetic resin material, which is conveyed precedently, and a leading end of a molded synthetic resin material, which is conveyed following the molded synthetic resin material which is conveyed precedently, are adjusted simultaneously with respect to two reference surfaces, which are close to each other and are spaced a predetermined distance apart from each other. A process is carried out simultaneously on or parts are simultaneously associated with both a portion in the vicinity of the tail end of the molded synthetic resin material, which is conveyed precedently, and a portion in the vicinity of the leading end of the molded synthetic resin material, which is conveyed following the molded synthetic resin material which is conveyed precedently, while the positions of the tail end and the leading end are kept in the adjusted states. Regardless of fluctuations in dimensions of molded synthetic resin materials, the process or parts association is carried out accurately such that the working efficiency may be kept high.

6 Claims, 3 Drawing Sheets

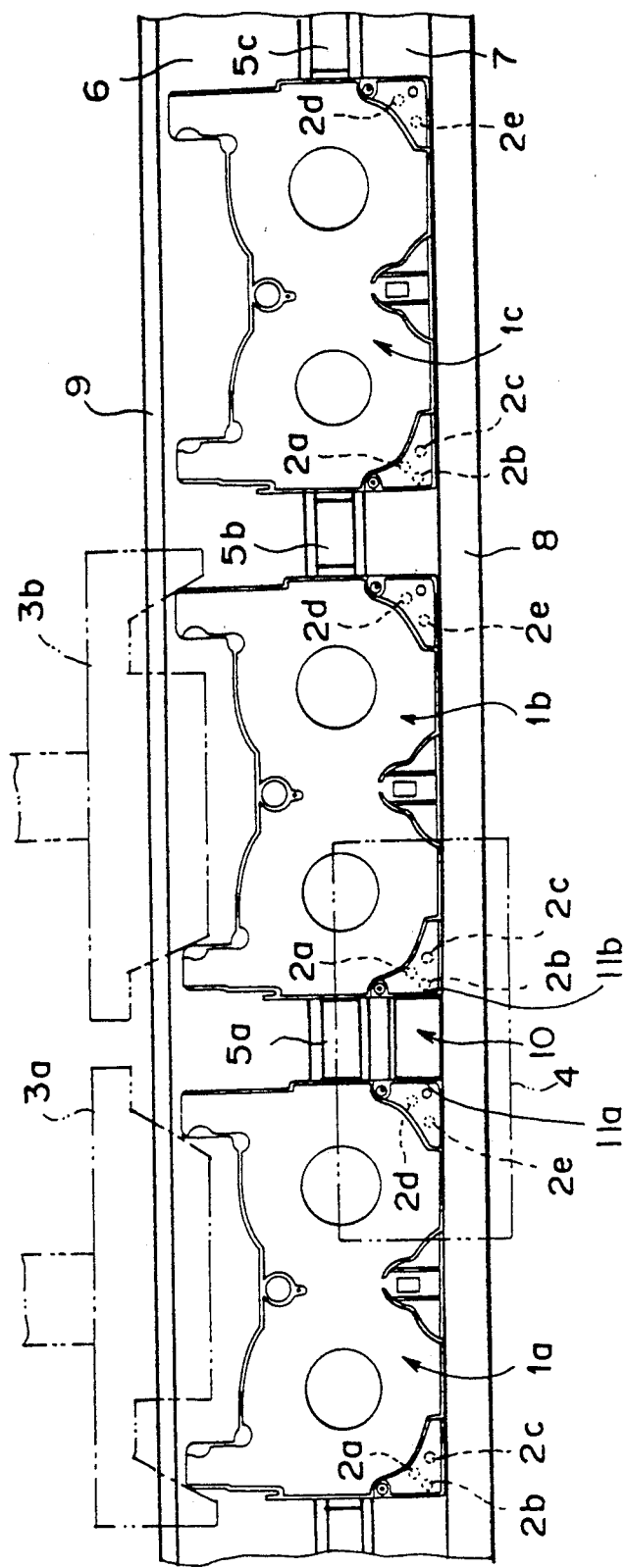

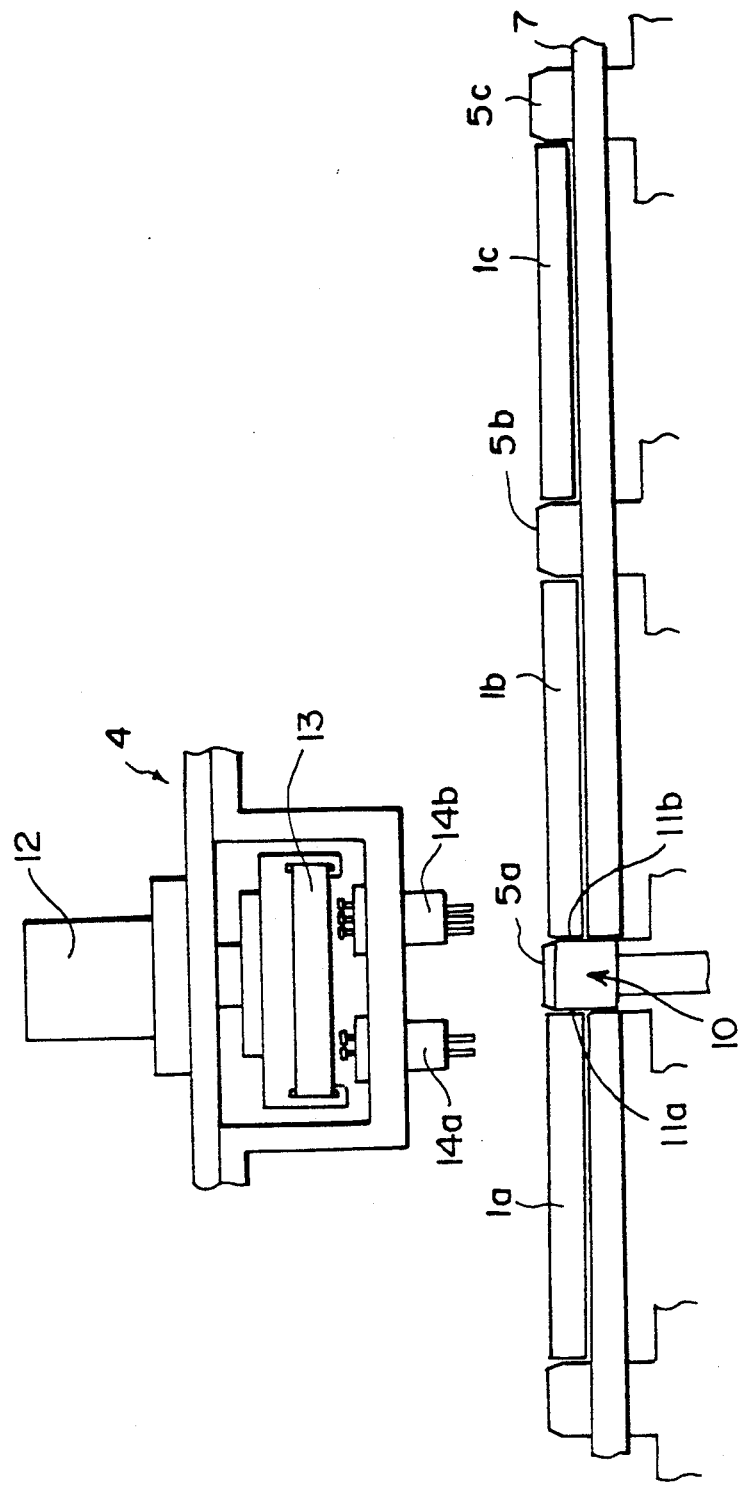

METHOD AND APPARATUS FOR PROCESSING MOLDED SYNTHETIC RESIN MATERIALS

This is a continuation of application Ser. No. 07/868,863 filed Apr. 16, 1992 now abandoned.

BACKGROUND OF THE INVENTION

1. Field of the Invention

This invention relates to a method and apparatus for processing molded synthetic resin materials, wherein a process is carried out on or parts are associated with a plurality of molded synthetic resin materials, which are conveyed one after another. This invention particularly relates to a method and apparatus for processing molded synthetic resin materials, wherein a process is carried out on or parts are associated with portions of a plurality of molded synthetic resin materials, which materials are conveyed intermittently, the portions being located in the vicinity of leading and tail ends of the plurality of the molded synthetic resin materials, which leading and tail ends are taken in the direction along which the plurality of the molded synthetic resin materials are conveyed.

2. Description of the Prior Art

In automatic processing lines, processes are carried out on or small parts are associated with predetermined portions of a plurality of molded synthetic resin materials, such as magnetic tape cassettes, which materials are conveyed intermittently. In such cases, positions of the molded synthetic resin materials are adjusted, and thereafter processes are carried out by processing means on the molded synthetic resin materials, the positions of which have been adjusted, or parts are associated by parts associating means with the molded synthetic resin materials, the positions of which have been adjusted.

In such automatic processing lines, it often occurs that a process is carried out by a single processing means simultaneously on portions of each of the plurality of the conveyed molded synthetic resin materials, such as portions in the vicinity of a leading end and a tail end of each molded synthetic resin material, which leading and tail ends are taken in the direction along which each molded synthetic resin material is conveyed. Such portions of each molded synthetic resin material are spaced far apart from each other. Also, it often occurs that parts are associated simultaneously by a single parts associating means with such portions of each molded synthetic resin material. As an example of such operations, a plurality of recognition holes are made through portions of a lower cassette half of a magnetic tape cassette, which portions are located in the vicinity of a leading end and a tail end of the lower cassette half. Such a perforating process is disclosed in, for example, Japanese Unexamined Patent Publication No. 2(1990)-30499.

FIG. 1 is a plan view showing a lower cassette half of a magnetic tape cassette. As illustrated in FIG. 1, in the disclosed process for making a plurality of recognition holes, recognition holes 2a, 2b, and 2c are made at a corner portion in the vicinity of a leading end of a lower cassette half 1. Also, recognition holes 2d and 2e are made at a corner portion in the vicinity of a tail end of the lower cassette half 1. The recognition holes 2a, 2b, 2c, 2d, and 2e are made simultaneously by a single perforating means. The positions, at which the recognition holes are made, are determined in accordance with the type and thickness of a tape accommodated in the magnetic tape cassette such that the type and thickness of the tape can be discriminated from others. It is necessary to carry out the process for making the recognition holes accurately.

However, dimensions of molded synthetic resin materials fluctuate due to differences among molds, differences among mold cavities, differences among lots, or the like. Therefore, in cases where a process is to be carried out by a single processing means accurately and simultaneously on portions of each of a plurality of molded synthetic resin materials, such as portions in the vicinity of a leading end and a tail end of each molded synthetic resin material, which portions are spaced far apart from each other, (as in the aforesaid process for making a plurality of recognition holes) or in cases where parts are to be associated accurately and simultaneously by a single parts associating means with such portions of each molded synthetic resin material, it is important which region of each molded synthetic resin material is taken as a reference for the position adjustment.

For example, in cases where the leading end of each molded synthetic resin material, which leading end is taken in the direction along which each molded synthetic resin material is conveyed, is employed as the reference for the position adjustment, a process can be carried out accurately on or parts can be associated accurately with the portion of the molded synthetic resin material in the vicinity of the leading end. However, because of fluctuations in the dimensions among the molded synthetic resin materials, the process cannot be carried out accurately o or the parts cannot be associated accurately with the portion of the molded synthetic resin material in the vicinity of the tail end. Such problems occur because the region employed as the reference for the position adjustment is spaced far apart from the portion of the molded synthetic resin material, on which the process is carried out or with which the parts are associated. Therefore, in order to eliminate the aforesaid problems, the region employed as the reference for the position adjustment and the portion of the molded synthetic resin material, on which the process is carried out or with which the parts are associated, should be as close to each other as possible.

However, when the region employed as the reference for the position adjustment and the portion of a molded synthetic resin material, on which a process is carried out or with which parts are associated, are set as close to each other as possible, problems described below occur. Specifically, in cases where the process is to be carried out on or the parts are to be associated with portions in the vicinity of the leading end and the tail end of each molded synthetic resin material, which is conveyed, in the manner described above, it is necessary that the region serving as the reference for the position adjustment is set at two regions (i.e., at the leading end and the tail end), and the position adjustment is carried out twice. However, if the region serving as the reference for the position adjustment is set at the leading end and the tail end, and the position adjustment is carried out twice, the process cannot be carried out by a single processing means simultaneously on the portions in the vicinity of the leading end and the tail end of each molded synthetic resin material in the manner described above. Also, the parts cannot be simultaneously associated by a single parts associating means with the portions in the vicinity of the leading end and the tail end of each molded synthetic resin material in the manner described above. As a result, the working efficiency cannot be kept high. Accordingly, a processing means or a parts associating means has heretofore been adjusted in accordance with fluctuations in the dimensions among molded synthetic resin material such that a process may be carried out simultaneously on or parts may be simultaneously associated with portions in the vicinity of the leading end and the tail end of each molded synthetic resin material, which portions are spaced far apart from each other. However, in such cases, the working efficiency cannot be kept high due to the operations for adjusting the processing means or the parts associating means.

SUMMARY OF THE INVENTION

The primary object of the present invention is to provide a method for processing molded synthetic resin materials, wherein a process is carried out accurately on or parts are associated accurately with portions of a plurality of molded synthetic resin materials, which materials are conveyed intermittently, the portions being located in the vicinity of leading and tail ends of the plurality of the molded synthetic resin materials, which leading and tail ends are taken in the direction along which the plurality of the molded synthetic resin materials are conveyed, and wherein the working efficiency can be kept high.

Another object of the present invention is to provide an apparatus for processing molded synthetic resin materials, wherein a process is carried out accurately on or parts are associated accurately with portions of a plurality of molded synthetic resin materials, which materials are conveyed intermittently, the portions being located in the vicinity of leading and tail ends of the plurality of the molded synthetic resin materials, which leading and tail ends are taken in the direction along which the plurality of the molded synthetic resin materials are conveyed, and wherein the working efficiency can be kept high.

The present invention provides a method for processing molded synthetic resin materials, wherein a process is carried out on or parts are associated with portions of a plurality of molded synthetic resin materials, which materials are conveyed intermittently, the portions being located in the vicinity of leading and tail ends of the plurality of the molded synthetic resin materials, which leading and tail ends are taken in the direction along which the plurality of the molded synthetic resin materials are conveyed, the method for processing molded synthetic resin materials comprising the steps of:

i) simultaneously adjusting positions of a tail end of a molded synthetic resin material, which is conveyed precedently, and a leading end of a molded synthetic resin material, which is conveyed following said molded synthetic resin material which is conveyed precedently, said positions being adjusted with respect to two reference surfaces, which are close to each other and are spaced a predetermined distance apart from each other, and ii) carrying out the process simultaneously on or simultaneously associating the parts with both a portion of said molded synthetic resin material, which is conveyed precedently, said portion being located in the vicinity of said tail end of said molded synthetic resin material, which is conveyed precedently, and a portion of said molded synthetic resin material, which is conveyed following said molded synthetic resin material which is conveyed precedently, said portion being located in the vicinity of said leading end of said molded synthetic resin material, which is conveyed following said molded synthetic resin material which is conveyed precedently, while the positions of said tail end and said leading end are kept in the adjusted states.

The present invention also provides an apparatus for processing molded synthetic resin materials, wherein a process is carried out on or parts are associated with portions of a plurality of molded synthetic resin materials, which materials are conveyed intermittently, the portions being located in the vicinity of leading and tail ends of the plurality of the molded synthetic resin materials, which leading and tail ends are taken in the direction along which the plurality of the molded synthetic resin materials are conveyed, the apparatus for processing molded synthetic resin materials comprising:

i) a position adjusting means provided with two reference surfaces, which are close to each other and are spaced a predetermined distance apart from each other, said position adjusting means simultaneously bringing a tail end of a molded synthetic resin material, which is conveyed precedently, and a leading end of a molded synthetic resin material, which is conveyed following said molded synthetic resin material which is conveyed precedently, into contact with two said reference surfaces, respectively, and thereby simultaneously adjusting positions of said tail end and said leading end with respect to two said reference surfaces, wherein said position adjusting means comprises position adjusting push members and a position adjusting block, and ii) a processing or parts associating means for carrying out the process simultaneously on or simultaneously associating the parts with both a portion of said molded synthetic resin material, which is conveyed precedently, said portion being located in the vicinity of said tail end of said molded synthetic resin material, which is conveyed precedently, and a portion of said molded synthetic resin material, which is conveyed following said molded synthetic resin material which is conveyed precedently, said portion being located in the vicinity of said leading end of said molded synthetic resin material, which is conveyed following said molded synthetic resin material which is conveyed precedently, while the positions of said tail end and said leading end are kept in the states adjusted by said position adjusting means, wherein said processing or parts associating means comprises a perforating means.

With the method and apparatus for processing molded synthetic resin materials in accordance with the present invention, the tail end of a molded synthetic resin material, which is conveyed precedently, and the leading end of a molded synthetic resin material, which is conveyed following the molded synthetic resin material which is conveyed precedently, are employed as the reference for the position adjustment. In this manner, the positions of these tail and leading ends are adjusted simultaneously. Thereafter, a process is carried out simultaneously on or parts are simultaneously associated with both a portion of the molded synthetic resin material, which is conveyed precedently, the portion being located in the vicinity of the tail end of the molded synthetic resin material, which is conveyed precedently, and a portion of the molded synthetic resin material, which is conveyed following the molded synthetic resin material which is conveyed precedently, the portion being located in the vicinity of the leading end of the molded synthetic resin material, which is conveyed following the molded synthetic resin material which is conveyed precedently, while the positions of the tail end and the leading end are kept in the adjusted states.

With the method and apparatus for processing molded synthetic resin materials in accordance with the present invention, the regions employed as the reference for the position adjustment are close to the portions, on which the process is carried out or with which the parts are associated. Therefore, even if the dimensions of molded synthetic resin materials fluctuate, the process can be carried out accurately on the portions or the parts can be accurately associated with the portions without the processing means or the parts associating means being adjusted in accordance with fluctuations in the dimensions of the molded synthetic resin materials. Also, the process can be carried out simultaneously on or parts can be simultaneously associated with both a portion in the vicinity of the tail end of the molded synthetic resin material, which is conveyed precedently, and a portion in the vicinity of the leading end of the molded synthetic resin material, which is conveyed following the molded synthetic resin material which is conveyed precedently. Therefore, the working efficiency can be kept high.

As described above, with the method and apparatus for processing molded synthetic resin materials in accordance with the present invention, instead of the region serving as the reference for the position adjustment being set on a single molded synthetic resin material, the regions serving as the reference for the position adjustment are set at the tail end of the molded synthetic resin material, which is conveyed precedently, and the leading end of the molded synthetic resin material, which is conveyed following the molded synthetic resin material which is conveyed precedently. In this manner, the regions serving as the reference for the position adjustment are set at the regions close to the positions on the two molded synthetic resin materials proximate to each other, at which positions the process is carried out or with which positions the parts are associated. Also, the positions of the two molded synthetic resin materials are adjusted simultaneously. Therefore, unlike the conventional technique, with which the working efficiency could not be kept high when the position adjustment is to be carried out accurately, a process can be carried out accurately on or parts can be associated accurately with portions of each molded synthetic resin material in the vicinity of its leading and tail ends, which leading and tail ends are taken in the direction of conveyance of the molded synthetic resin material and are spaced far apart from each other, such that the working efficiency can be kept high. These effects of the method and apparatus for processing molded synthetic resin materials in accordance with the present invention are very advantageous in practical use.

BRIEF DESCRIPTION OF THE DRAWINGS

FIG. 2 is a schematic plan view showing an embodiment of the apparatus for processing molded synthetic resin materials in accordance with the present invention, and FIG. 3 is a schematic front view showing the embodiment of FIG. 2 with a reference guide being omitted for clearness.

DESCRIPTION OF THE PREFERRED EMBODIMENTS

Figure 1:
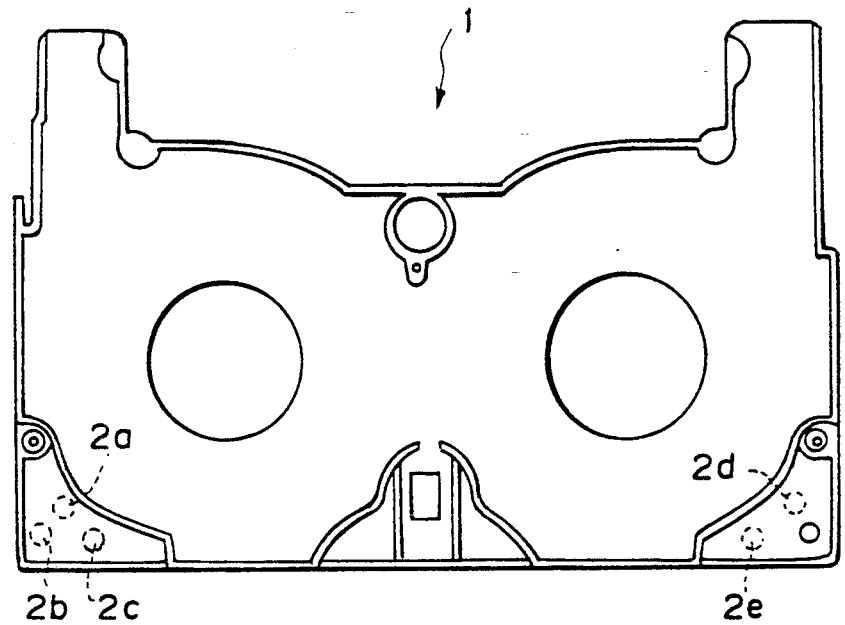
FIG. 1 is a plan view showing a lower cassette half of a magnetic tape cassette, which is processed with an embodiment of the apparatus for processing molded synthetic resin materials in accordance with the present invention.

The present invention will hereinbelow be described in further detail with reference to the accompanying drawings.

FIG. 1 is a plan view showing a lower cassette half of a magnetic tape cassette, which is processed with an embodiment of the apparatus for processing molded synthetic resin materials in accordance with the present invention. FIG. 2 is a schematic plan view showing an embodiment of the apparatus for processing molded synthetic resin materials in accordance with the present invention. FIG. 3 is a schematic front view showing the embodiment of FIG. 2 with a reference guide being omitted for clearness.

In this embodiment, as illustrated in FIG. 1, a group of recognition holes 2a, 2b, and 2c are made through a portion in the vicinity of a leading end of a lower cassette half 1 of a magnetic tape cassette. Also, a group of recognition holes 2d and 2e are made through a portion in the vicinity of a tail end of the lower cassette half 1. As described above, the positions, at which the recognition holes 2a, 2b, 2c, 2d, and 2e are made, are determined in accordance with the type and thickness of a tape accommodated in the magnetic tape cassette such that the type and thickness of the tape can be discriminated from others. It is necessary to carry out the process for making the recognition holes 2a, 2b, 2c, 2d, and 2e accurately. Heretofore, the recognition holes 2a, 2b, and 2c, which are located in the vicinity of the leading end of the lower cassette half 1, and the recognition holes 2d and 2e, which are located in the vicinity of the tail end of the lower cassette half 1, have been made simultaneously with a single perforating means. Therefore, it was necessary that the perforating means was adjusted in accordance with fluctuations in the dimensions of the lower cassette half 1.

With reference to FIGS. 2 and 3, in this embodiment of the apparatus for processing molded synthetic resin materials in accordance with the present invention, a plurality of lower cassette halves 1a, 1b, 1c, . . . are conveyed intermittently. This embodiment is provided with position adjusting push members 3a and 3b, which adjusts the positions of the lower cassette halves 1a, 1b, and 1c at predetermined positions. This embodiment is also provided with a perforating means 4 for making the group of the recognition holes 2a, 2b, and 2c, which is located at a portion of the lower cassette half 1 in the vicinity of its leading end, and the group of the recognition holes 2d and 2c, which are located at a portion of the lower cassette half 1 in the vicinity of its tail end.

As illustrated in FIG. 2, the lower cassette halves 1a, 1b, and 1c are conveyed by feed claws 5a, 5b, and 5c of an intermittent feed means along a reference guide 8 and a side guide 9. The reference guide 8 and the side guide 9 extend on conveyance rails 6 and 7 in the direction, along which the lower cassette halves 1a, 1b, and 1c are conveyed. When a portion of the lower cassette half 1a in the vicinity of its tail end and a portion of the lower cassette half 1b in the vicinity of its leading end reach the predetermined positions below the perforating means 4, a position adjusting block 10 is moved up by a driving means (not shown) and enters into the region between the lower cassette half 1a and the lower cassette half 1b. The position adjusting block 10 is provided with reference surfaces for position adjustment 11a and 11b at its leading and tail ends, which are taken in the direction of conveyance of the lower cassette halves 1a, 1b, and 1c.

After the position adjusting block 10 has thus moved up, the position adjusting push members 3a and 3b are moved by a driving means (not shown) towards the lower cassette halves 1a and 1b. The position adjusting push member 3a pushes a corner of the tail end of the lower cassette half 1a at the side of the reference guide 8 against the reference surface 11a of the position adjusting block 10 and the inner side surface of the reference guide 8 and thereby adjusts the position of the lower cassette half 1a. The position adjusting push member 3b pushes a corner of the leading end of the lower cassette half 1b at the side of the reference guide 8 against the reference surface 11b of the position adjusting block 10 and the inner side surface of the reference guide 8 and thereby adjusts the position of the lower cassette half 1b.

As illustrated in FIG. 3, after the positions of the lower cassette halves 1a and 1b have been adjusted in the manner described above, the whole perforating means 4 moves down. An air cylinder 12 pushes a plate 13, which in turn pushes upper parts of pin blocks 14a and 14b. The pin block 14a accurately makes the recognition holes 2d and 2e through the portion in the vicinity of the tail end of the lower cassette half 1a. Also, the pin block 14b accurately makes the recognition holes 2a, 2b, and 2c through the portion in the vicinity of the leading end of the lower cassette half 1b. After the perforating process has thus been finished, the perforating means 4 moves up and returns to its original position. At the same time, the position adjusting push members 3a and 3b move away from the lower cassette halves 1a and 1b, and the position adjusting block 10 moves down. In this manner, the lower cassette halves 1a and 1b are released from the position adjusting force. Thereafter, the lower cassette halves 1a and 1b are again conveyed by the intermittent feed means together with the other lower cassette halves to the downstream side.

The operation described above is repeated, and the process for making the recognition holes 2a, 2b, 2c, 2d, and 2e through each lower cassette half is completed.

With this embodiment, the positions of the recognition holes 2a, 2b, 2c, 2d, and 2e are adjusted with reference to positions that are very close to the recognition holes. Therefore, even if the dimensions of the lower cassette half, which is constituted of a synthetic resin, fluctuate, the recognition holes 2a, 2b, 2c, 2d, and 2e can be made accurately and reliably such that their center points may be located at correct positions. Therefore, problems do not occur in that chips of the synthetic resin occur due to defective perforation and inner walls of the recognition holes are scratched. Also, the perforating means 4 need not be adjusted each time the dimensions of the lower cassette half fluctuate. Additionally, the pin blocks 14a and 14b simultaneously makes the five recognition holes 2a, 2b, 2c, 2d, and 2e, and therefore the process can be carried out efficiently. Further, the pin blocks 14a and 14b can be located close to each other. Therefore, only a single set of the perforating means 4 need be employed, and the cost of the apparatus for processing molded synthetic resin materials in accordance with the present invention can be kept low.

The method and apparatus for processing molded synthetic resin materials are not limited to the embodiment described above and may be embodied in various other ways.

For example, in the aforesaid embodiment, the recognition holes are made through portions in the vicinity of the leading and tail ends of the lower cassette halves of magnetic tape cassettes. However, the method and apparatus for processing molded synthetic resin materials in accordance with the present invention are also applicable when other types of processes are carried out on or parts are associated with portions of a plurality of molded synthetic resin materials, which materials are conveyed intermittently, the portions being located in the vicinity of leading and tail ends of the plurality of the molded synthetic resin materials.

Also, the shape, the structure, and the operation of the position adjusting means, which is constituted of the position adjusting block having two reference surfaces and the position adjusting push members, may be modified appropriately in accordance with the shape and properties of the molded synthetic resin materials, the type of the work, the structure of the intermittent feed means, or the like.

What is claimed is:

1. A method for processing molded synthetic resin materials, wherein at least one of a procedure is carried out on and parts are associated with portions of a plurality of molded synthetic resin materials, wherein said resin materials are conveyed intermittently, the portions being located near leading and tail ends of said resin materials, wherein said leading and tail ends are designated in a direction along which said resin materials are conveyed so that said tail ends follow respective said leading ends, the method for processing molded synthetic resin materials comprising the steps of:

i) simultaneously adjusting positions of a tail end of a first molded synthetic resin material and a leading end of a second molded synthetic resin material which is conveyed following said first molded synthetic resin material, said positions being adjusted with respect to two reference surfaces, which are spaced a predetermined distance apart from each other, said reference surfaces being opposite sides of a position adjusting block, wherein said first molded synthetic resin material is abutted against one reference surface and said second molded synthetic resin material is abutted against another reference surface, and ii) performing at least one of carrying out a procedure simultaneously on and simultaneously associating parts with both a first portion of said first molded synthetic resin material, said first portion being located near said tail end of said first molded synthetic resin material, and a second portion of said second molded synthetic resin material, said second portion being located near said leading end of said second molded synthetic resin material, while said positions of said tail end and said leading end are kept in adjusted states.

2. A method as defined in claim 1 wherein said molded synthetic resin materials are lower cassette halves of magnetic tape cassettes.

3. A method as defined in claim 2 wherein said procedure includes the step of making holes through the portions near said leading and tail ends of said lower cassette halves.

4. An apparatus for processing molded synthetic resin materials, where at least one of a procedure is carried out on and parts are associated with portions of a plurality of molded synthetic resin materials, wherein said resin materials are conveyed intermittently, the portions being located near leading and tail ends of said resin materials, wherein said leading and tail ends are designated in a direction along which said resin materials are conveyed so that said tail ends follow respective said leading ends, the apparatus for processing molded synthetic resin materials comprising:

i) a position adjusting means provided with two reference surfaces, which are spaced a predetermined distance apart from each other, said position adjusting means simultaneously bringing a tail end of a first molded synthetic resin materials and a leading end of a second molded synthetic resin materials which is conveyed following said first molded synthetic resin materials into contact with said reference surfaces, respectively, and thereby simultaneously adjusting positions of said tail end and said leading end with respect to said reference surfaces, said reference surfaces being opposite sides of a position adjusting block, wherein said first molded synthetic resin material is abutted against one reference surface and said second molded synthetic resin material is abutted against another reference surface, and ii) a processing or parts associated means for performing at least one of carrying out a procedure simultaneously on and simultaneously associating parts with both a first portion of said first molded synthetic resin material, said first portion being located near said tail end of said molded synthetic resin material, and a second portion of said second molded synthetic resin material, said second portion being located near said leading end of said second molded synthetic resin material, while said positions of said tail end and said leading end are kept in states adjusted by the said position adjusting means.

5. An apparatus as defined in claim 4 wherein said molded synthetic resin materials are lower cassette halves of magnetic tape cassettes.

6. An apparatus as defined in claim 5 wherein said procedure includes the step of making holes through the portions near said leading and tail ends of the lower cassette halves.

* * * * *